United States Patent
Shachar et al.

(10) Patent No.: US 12,499,233 B2
(45) Date of Patent: Dec. 16, 2025

(54) BIOS PROTECTION USING BIOS UPDATE SUPPRESSION

(71) Applicant: Dell Products L.P., Round Rock, TX (US)

(72) Inventors: Tomer Shachar, Beer Sheva (IL); Ophir Buchman, Raanana (IL); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 196 days.

(21) Appl. No.: 18/123,001

(22) Filed: Mar. 17, 2023

(65) Prior Publication Data

US 2024/0311484 A1 Sep. 19, 2024

(51) Int. Cl.
 *G06F 21/57* (2013.01)
 *G06F 8/65* (2018.01)

(52) U.S. Cl.
 CPC .............. *G06F 21/572* (2013.01); *G06F 8/65* (2013.01); *G06F 2221/033* (2013.01)

(58) Field of Classification Search
 None
 See application file for complete search history.

(56) References Cited

U.S. PATENT DOCUMENTS

| | | | |
|---|---|---|---|
| 6,732,267 B1* | 5/2004 | Wu | H04L 41/082 713/100 |
| 2007/0220244 A1* | 9/2007 | Mahmoud | G06F 8/654 713/2 |
| 2013/0185549 A1* | 7/2013 | Hu | G06F 9/4401 713/2 |
| 2016/0012245 A1* | 1/2016 | Cudak | G06F 21/6218 726/26 |
| 2017/0053111 A1* | 2/2017 | Stewart | G06F 9/4406 |
| 2018/0004502 A1* | 1/2018 | Samuel | G06F 9/4401 |
| 2018/0285123 A1* | 10/2018 | Kumar | G06F 9/22 |

OTHER PUBLICATIONS

"What is BIOS?"; updated Feb. 18, 2023; https://www.easytechjunkie.com/what-is-bios.htm; downloaded on Mar. 14, 2023.

(Continued)

*Primary Examiner* — Raqiul A Choudhury
(74) *Attorney, Agent, or Firm* — Ryan, Mason & Lewis, LLP

(57) ABSTRACT

Techniques are provided for basic input/output system (BIOS) protection using BIOS update suppression. One method comprises receiving, by an operating system of a processing device comprising a BIOS chip having a first BIOS version, a request to suppress a pending BIOS update; and suppressing an application of the pending BIOS update, in response to the request, wherein a boot process of the processing device uses the first BIOS version. The suppressing may comprise clearing a BIOS staging environment of the at least one BIOS chip and/or resetting a BIOS update flag. A user of the processing device may be notified of the pending BIOS update, in response to detecting that an update of the first BIOS version is pending. The request may be received responsive to the notification.

20 Claims, 7 Drawing Sheets

(56) References Cited

OTHER PUBLICATIONS

"Remediation Planning Guidance for Meltdown and Spectre"; https://www.westmonroe.com/perspectives/point-of-view/remediation-planning-guidance-for-meltdown-and-spectre; downloaded on Mar. 14, 2023.

"How to Reset BIOS Settings on Windows PCs"; dated Jan. 15, 2023; https://www.hp.com/hk-en/shop/tech-takes/post/how-to-reset-bios-settings-on-windows-pcs; downloaded on Mar. 14, 2023.

\* cited by examiner

BIOS PROTECTION USING BIOS UPDATE SUPPRESSION

FIELD

The field relates generally to information processing systems, and more particularly to the protection of devices in such information processing systems.

BACKGROUND

Computing devices are typically configured to incorporate security functionality to protect such devices from malicious activity. For example, it is generally desirable to prevent suspicious computer operations, and to ensure that operations are implemented by legitimate and authorized users. Role-based access control (RBAC) techniques may be employed to restrict access to devices or network resources based on the roles of individual users within an organization. RBAC techniques typically allow users to access only the information and other resources needed for their jobs and prevent users from accessing additional resources. RBAC techniques, however, are vulnerable to various types of attacks, such as password theft and/or session hijacking.

A need exists for improved techniques for protecting devices from suspicious and/or unauthorized computer operations.

SUMMARY

In one embodiment, a method comprises receiving, by an operating system of at least one processing device comprising at least one basic input/output system (BIOS) chip having a first BIOS version, a request to suppress a pending BIOS update; and suppressing an application of the pending BIOS update, in response to the request, wherein a boot process of the at least one processing device uses the first BIOS version.

In some embodiments, the suppressing comprises clearing a BIOS staging environment of the at least one BIOS chip, wherein the BIOS staging environment comprises an image of a second BIOS version associated with the pending BIOS update. The suppressing may comprise resetting a BIOS update flag.

In one or more embodiments, a user of the at least one processing device is notified of the pending BIOS update, in response to detecting that an update of the first BIOS version is pending. Prior to the detecting that the update of the first BIOS version is pending, a BIOS production environment of the at least one BIOS chip may comprise a production BIOS version and a BIOS staging environment comprises an image of a second BIOS version. The detecting that the update of the first BIOS version is pending may comprise one or more of detecting that a BIOS update flag is set and detecting that a BIOS staging environment comprises the image of a second BIOS version. The request may be received responsive to the notification. The user request may comprise one or more of an affirmative request to suppress the pending BIOS update, the user declining to approve the application of the pending BIOS update and a failure of the user to respond to a notification within a designated time.

Other illustrative embodiments include, without limitation, apparatus, systems, methods and computer program products comprising processor-readable storage media.

DETAILED DESCRIPTION

Figure 1:
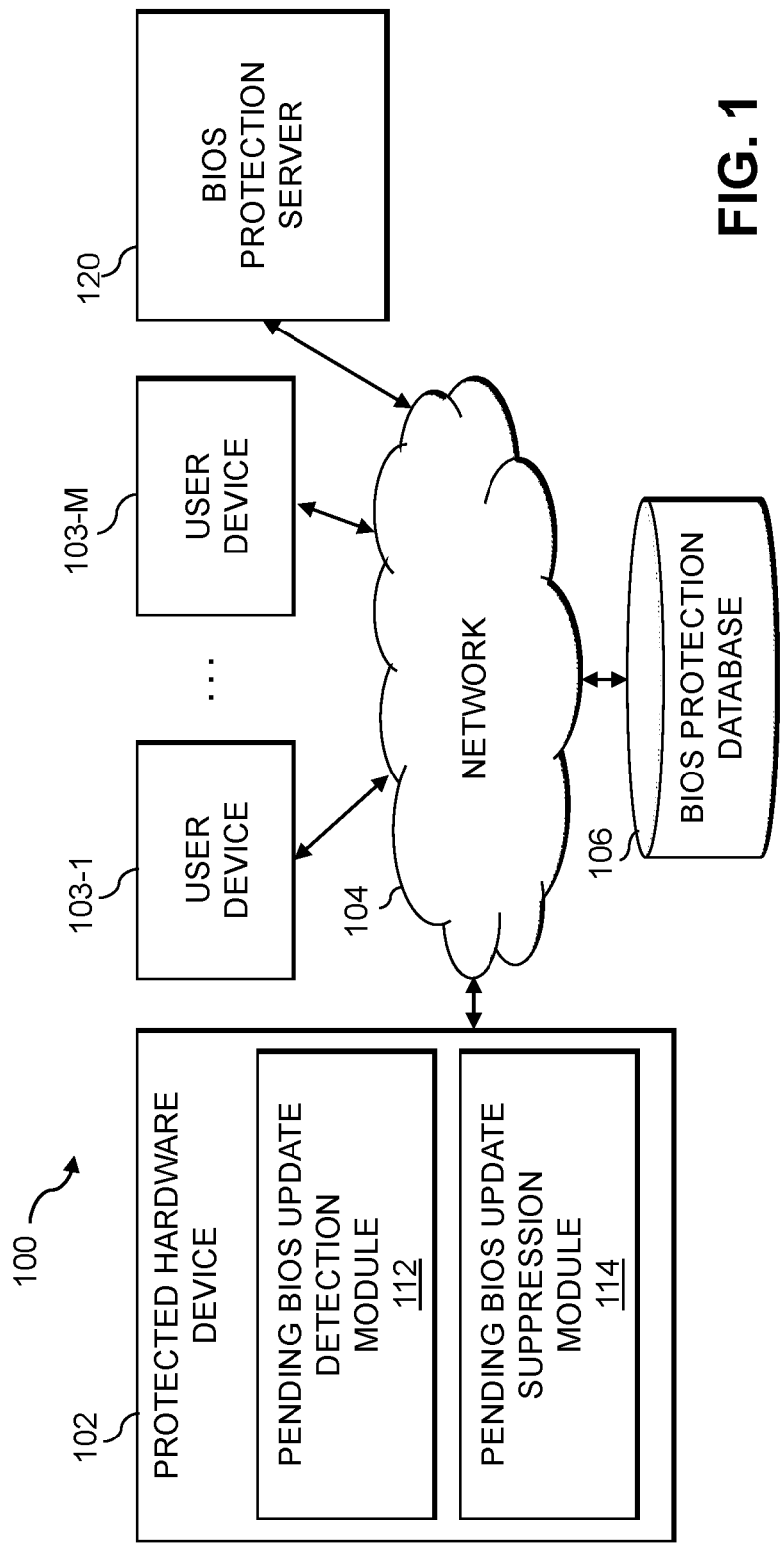
FIG. 1 illustrates an information processing system configured for BIOS protection using BIOS update suppression in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for BIOS protection using BIOS update suppression.

The BIOS of a given device initializes hardware components of the given device during a boot process and allows the hardware components to properly communicate and work together during device startup. One or more aspects of the disclosure recognize that malicious or unauthorized modifications of a BIOS chip or metadata associated with the BIOS chip may cause a denial of service or permit an unauthorized operating system to be loaded (sometimes referred to as a backdoor attack that may cause unpredictable damage). A BIOS chip is thus important for the proper operation of a given device, and if the BIOS chip is corrupted or damaged, the given device will typically be unable to start up. In addition, a recovery of the BIOS when the BIOS chip is corrupted or damaged is typically complex, costly, and may require a hardware replacement.

In one or more embodiments, techniques are provided for BIOS protection using BIOS update suppression. In some embodiments, when a BIOS update is pending, a user can request to suppress the application of the pending BIOS update. The user may be notified of the pending BIOS update and in some embodiments may be asked to approve the application of the pending BIOS update. The request may comprise an affirmative request to suppress the pending BIOS update (e.g., by pressing a designated button or by submitting an affirmative suppression command, for example), the user declining to approve the application of the pending BIOS update and the user not responding to a notification within a designated time. The BIOS chip then continues to utilize the current BIOS to initialize the startup process of a protected hardware device. The suppression of the pending BIOS update may comprise clearing a BIOS staging environment that comprises an image of a new BIOS version associated with the pending BIOS update and/or resetting a BIOS update flag.

In some embodiments, the disclosed BIOS update suppression techniques can be employed to protect a given device following a detection of a pending BIOS update (e.g., by a manual or an automated detection). The BIOS update suppression techniques may be employed to protect the current BIOS and prevent the pending BIOS update from being installed. In this manner, the current BIOS will remain active to initiate the boot process that allows the operating system of the given device to load.

Among other benefits, the disclosed BIOS update suppression techniques protect devices from unauthorized, erroneous and/or malicious actions that may impair the operation of a BIOS chip of a given device. Such actions can be detected and overcome using the disclosed BIOS update suppression techniques.

FIG. 1 shows a computer network (also referred to herein as an information processing system) 100 configured in accordance with an illustrative embodiment. The computer network 100 comprises a plurality of user devices 103-1 through 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more protected hardware devices 102, one or more BIOS protection servers 120 and one or more BIOS protection databases 106, discussed below.

The protected hardware devices 102 may comprise edge devices, host devices and other devices that execute user commands. One or more aspects of the disclosure recognize that edge devices, for example, are attractive targets for an attack and often comprise critical infrastructure that may require an evaluation of whether to execute certain commands and/or operations and/or whether the BIOS has been altered. Edge devices may be stored, for example, in a physical location that may not be properly secured. An attacker may be able to access a perimeter of a location of the edge device (or another adjacent or nearby location that is within range of the edge device).

The user devices 103 may comprise, for example, host devices and/or devices such as mobile telephones, laptop computers, tablet computers, desktop computers or other types of computing devices. Such devices are examples of what are more generally referred to herein as "processing devices" which may be protected using the disclosed device protection techniques. Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary protected hardware device 102 may comprise a pending BIOS update detection module 112, and a pending BIOS update suppression module 114. The pending BIOS update suppression module 114 may be activated to perform the disclosed BIOS update suppression techniques in response to the pending BIOS update detection module 112 detecting a pending BIOS update. For example, a user may press a BIOS update suppression button following a detection of an unauthorized pending BIOS update to protect the current BIOS and allow the current BIOS to initialize the startup process of the exemplary protected hardware device 102, as discussed further below in conjunction with FIG. 3.

It is to be appreciated that this particular arrangement of modules 112, 114 illustrated in the protected hardware device 102 of the FIG. 1 embodiment is presented by way of example only, and alternative arrangements can be used in other embodiments. For example, the functionality associated with modules 112, 114 in other embodiments can be combined into a single element, or separated across a larger number of elements. As another example, multiple distinct processors can be used to implement different ones of modules 112, 114, or portions thereof.

At least portions of modules 112, 114 may be implemented at least in part in the form of software that is stored in memory and executed by a processor. An exemplary process utilizing modules 112, 114 of the protected hardware device 102 in computer network 100 will be described in more detail with reference to FIGS. 3 through 5, for example.

Other protected hardware devices 102 (not shown in FIG. 1) are assumed to be configured in a manner similar to that shown for protected hardware device 102 in the figure.

The BIOS protection server 120 may be implemented, for example, on the cloud, such as a private cloud, or on the premises of an enterprise or another entity. In some embodiments, the BIOS protection server 120, or portions thereof, may be implemented as part of a host device. The BIOS protection server 120 may implement server-side functionality associated with the disclosed BIOS update suppression techniques, such as, for example, implementing performance monitoring and policies for protection requirements for BIOS chips.

Additionally, the protected hardware device 102 and/or the BIOS protection server 120 can have an associated BIOS protection database 106 configured to store, for example, a set of policies for BIOS protection and/or information related to various devices, such as one or more protected hardware devices 102, such as device locations, network address assignments and performance data. The BIOS protection database 106 may be maintained, for example, by the BIOS protection server 120 and accessible by one or more protected hardware devices 102.

The BIOS protection database 106 in the present embodiment is implemented using one or more storage systems associated with the BIOS protection server 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more protected hardware devices 102, user devices 103 and/or BIOS protection servers 120 may be implemented on a common processing platform, or on separate processing platforms. The one or more protected hardware devices 102 and user devices 103 may be configured to interact over the network 104 in at least some embodiments with the BIOS protection server 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and the storage system to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more protected hardware devices 102, user devices 103 and/or BIOS protection servers 120 can be one or more input-output devices (not shown), which illustratively comprise keyboards, displays or other types of input-output devices in any combination. Such input-output devices can be used, for example, to support one or more user interfaces to the BIOS protection server 120, as well as to support communication between the BIOS protection server 120 and other related systems and devices not explicitly shown.

The one or more protected hardware devices 102, user devices 103 and/or BIOS protection servers 120 in the FIG. 1 embodiment are assumed to be implemented using at least one processing device. Each such processing device generally comprises at least one processor and an associated memory and implements one or more functional modules for controlling certain features of the respective device.

More particularly, the one or more protected hardware devices 102, user devices 103 and/or BIOS protection servers 120 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more protected hardware devices 102, user devices 103 and/or BIOS protection servers 120 to communicate in some embodiments over the network 104 with each other (as well as one or more other networked devices), and illustratively comprises one or more conventional transceivers.

It is to be understood that the particular set of elements shown in FIG. 1 for BIOS protection using BIOS update suppression is presented by way of illustrative example only, and in other embodiments additional or alternative elements may be used. Thus, another embodiment includes additional or alternative systems, devices and other network entities, as well as different arrangements of modules and other components.

Figure 2:
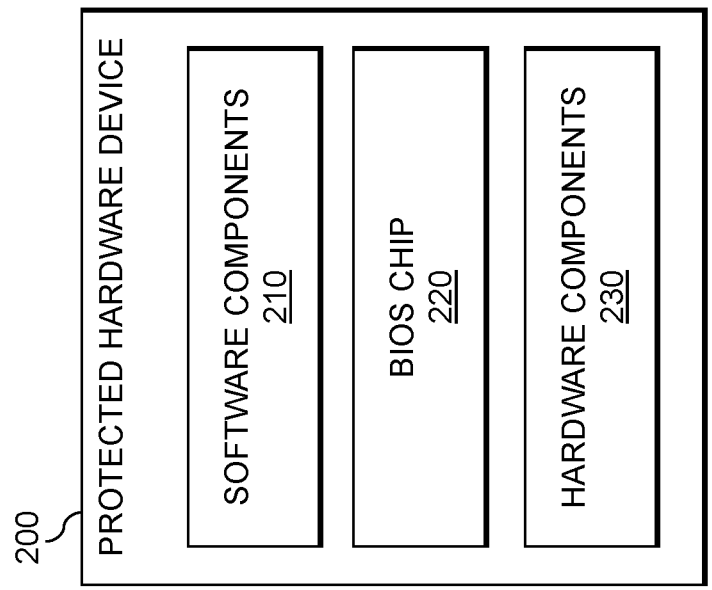
FIG. 2 illustrates the protected hardware device of FIG. 1 in further detail in accordance with an illustrative embodiment.

FIG. 2 illustrates a protected hardware device 200 in accordance with an illustrative embodiment. In the example of FIG. 2, the protected hardware device 200 comprises one or more software components 210, a BIOS chip 220, and one or more hardware components 230. The BIOS chip 220 may be implemented, for example, as a BIOS (Basic Input Output System) chip, an Extensible Firmware Interface (EFI) BIOS chip, and/or a Unified Extensible Firmware Interface (UEFI) BIOS chip. The BIOS chip 220 typically initializes hardware during a boot process for a given device. A malicious modification of the BIOS or metadata associated with the BIOS can cause a denial of service or permit an unauthorized operating system to be loaded (sometimes referred to as a backdoor attack that may cause unpredictable damage).

A kernel (e.g., resident in the memory of the protected hardware device 200) may provide an interface between the software components 210 and the hardware components 230. The term kernel, as used herein, encompasses any computer program that is part of an operating system of a protected hardware device 200 that enables interactions between such software components 210, such as applications, and the hardware components 230 of the protected hardware device 200. The hardware components 230 may comprise, for example, processing components, memory components, storage components and other hardware components.

Figure 3:
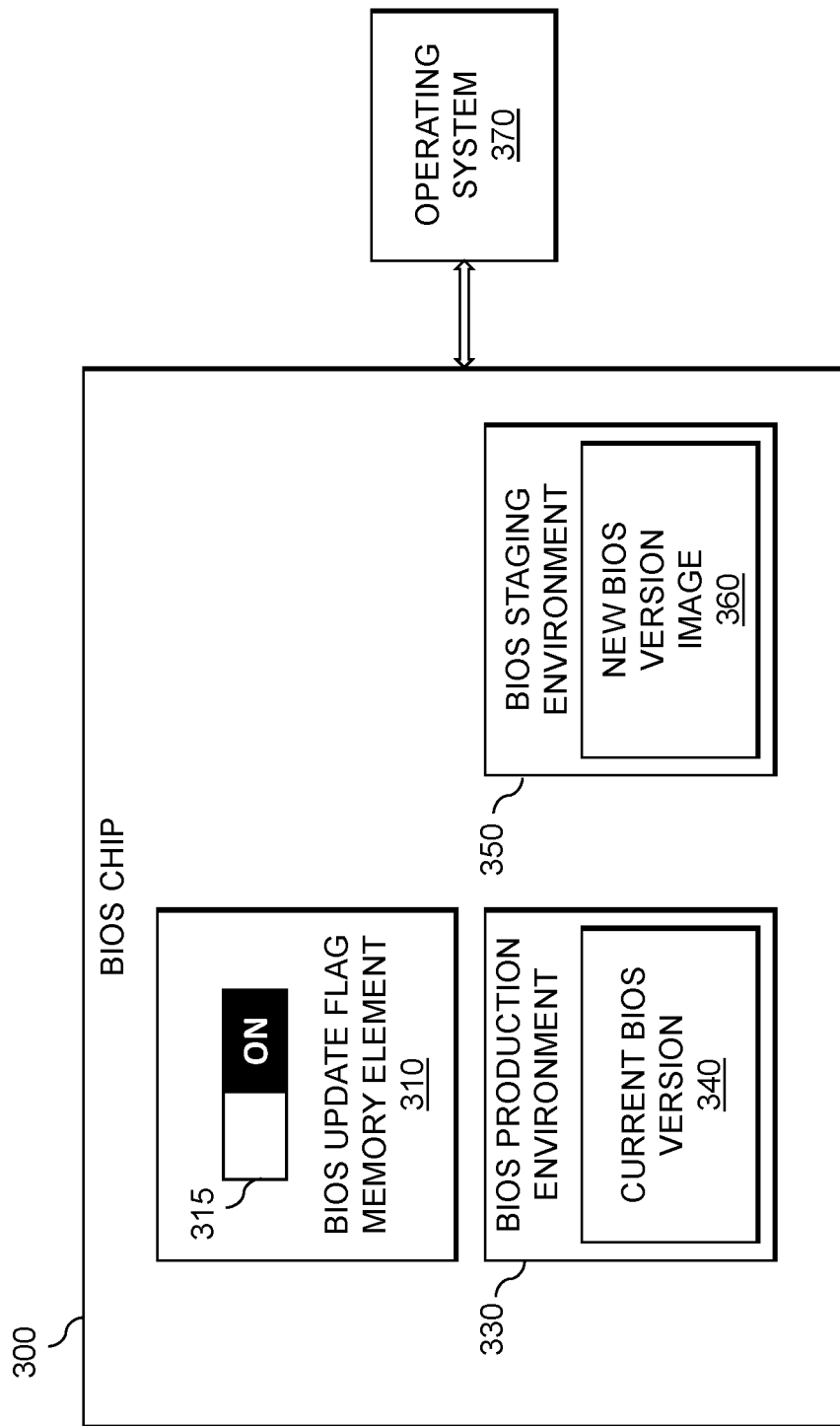
FIG. 3 illustrates a BIOS chip configured to employ BIOS update suppression in accordance with an illustrative embodiment.

FIG. 3 illustrates a BIOS chip 300 of a protected hardware device configured to employ BIOS update suppression in accordance with an illustrative embodiment. In the example of FIG. 3, the BIOS chip 300 comprises a BIOS update flag memory element 310 (e.g., storing a BIOS update flag value 315), a BIOS production environment 330, comprising a current BIOS version 340, and a BIOS staging environment 350, comprising a new BIOS version image 360. The BIOS chip 300 may be implemented, for example, as an EFI BIOS chip, and/or a UEFI BIOS chip, as modified herein to provide the disclosed BIOS update suppression techniques. The BIOS chip 300 interacts with an operating system 370 of the protected hardware device.

In some embodiments, when a BIOS update is pending, a user can request to suppress the application of the pending BIOS update. A pending BIOS update may be detected using manual or automated detection techniques. For example, a user may learn of a pending BIOS update (e.g., if the user initiated the pending BIOS update in error and/or the user learns of an unauthorized pending BIOS update, for example, associated with malware) and initiate a request to suppress the pending BIOS update. In some embodiments, an automated detection mechanism may detect that (i) the BIOS update flag value 315 is set (providing an indication of the pending BIOS update to be installed upon the next device reboot operation) and/or (ii) the BIOS staging environment 350 comprises a new BIOS version image 360 (to be installed upon the next device reboot operation).

In response to the detection of the pending BIOS update, the user may be notified of the pending BIOS update. In some embodiments, the user may be asked to approve the application of the pending BIOS update. A request to suppress an application of the detected pending BIOS update may comprise an affirmative request to suppress the pending BIOS update (e.g., by pressing a designated button or by submitting an affirmative suppression command, for example), the user declining to approve the application of the pending BIOS update and the user not responding to a notification within a designated time. The suppression of the pending BIOS update may comprise clearing a BIOS staging environment that comprises an image of a new BIOS version associated with the pending BIOS update and/or resetting a BIOS update flag. The BIOS chip then continues to utilize the current BIOS to initialize the startup process of a protected hardware device.

Figure 4:
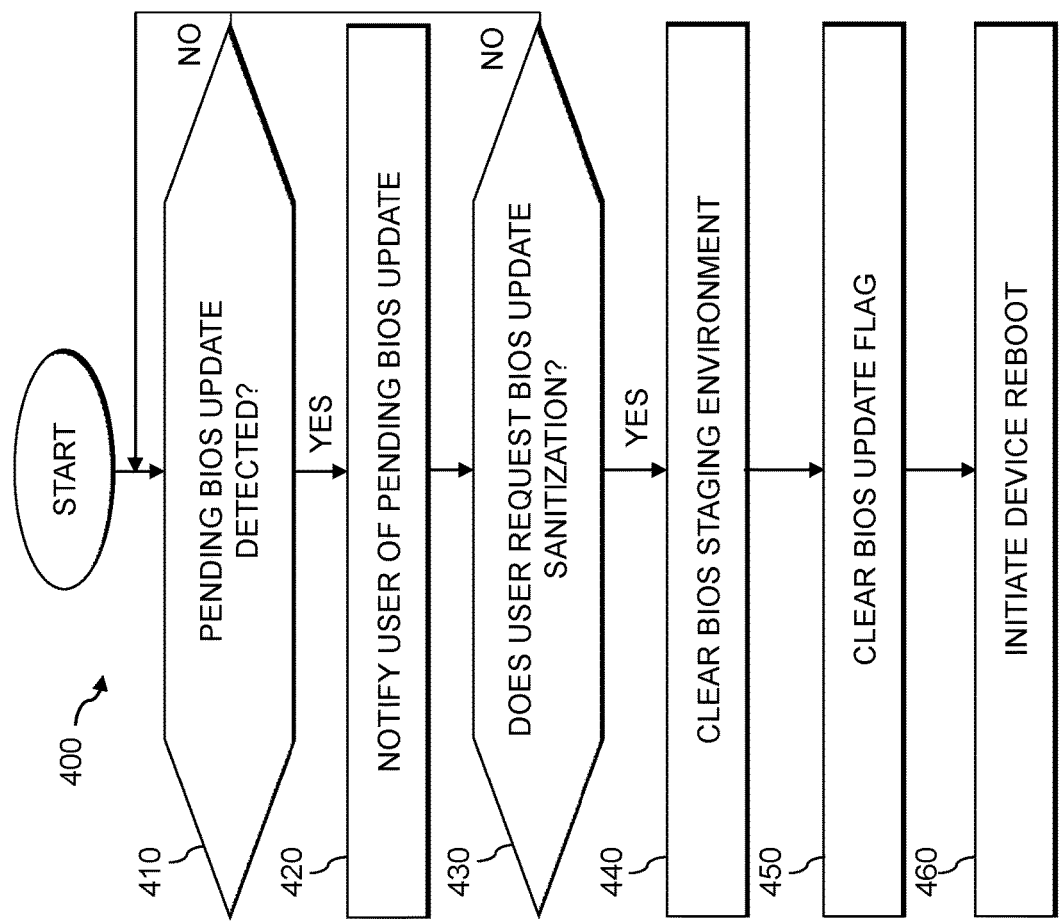
FIGS. 4 and 5 are flow charts illustrating exemplary implementations of processes for BIOS protection using BIOS update suppression in accordance with illustrative embodiments.

FIG. 4 is a flow chart illustrating an exemplary implementation of a process 400 for BIOS protection using BIOS update suppression in accordance with an illustrative embodiment. In at least some embodiments, the process 400 is implemented, for example, by the operating system 370 of FIG. 3.

In the example of FIG. 4, the process 400 may perform a test in step 410 to determine if a pending BIOS update is detected. If it is determined in step 410 that a pending BIOS update is not detected, then program control returns to step 410 until a pending BIOS update is detected. Once it is determined in step 410 that a pending BIOS update is detected, then the user may be notified in step 420 of the pending BIOS update.

A further test is performed in step 430 to determine if the user requests a BIOS update sanitization. A user request to suppress an application of the detected pending BIOS update may comprise, for example, an affirmative user request to suppress the pending BIOS update (e.g., by pressing a designated button or by submitting an affirmative suppression command, for example), the user declining to approve the application of the pending BIOS update and the user not responding to a notification within a designated time.

If it is determined in step 430 that the user does not request a BIOS update sanitization, then program control returns to step 410 until another pending BIOS update is detected. The pending BIOS update may thus be applied to update the current BIOS upon the next execution of a boot process.

If, however, it is determined in step 430 that the user requests a BIOS update sanitization, then the process 400 clears the BIOS staging environment (e.g., BIOS staging environment 350) in step 440 and clears the BIOS update flag value 315 in step 450.

The process 400 may initiate a device reboot in step 460, which will utilize the current BIOS to initialize the hardware components.

Figure 5:

FIG. 5 is a flow chart illustrating an exemplary implementation of a process 500 for BIOS protection using BIOS update suppression in accordance with an illustrative embodiment. In the example of FIG. 5, the process 500 receives, in step 502, by an operating system of at least one processing device comprising at least one BIOS chip having a first BIOS version, a request to suppress a pending BIOS update; and in step 504 suppressing an application of the pending BIOS update, in response to the request, wherein a boot process of the at least one processing device uses the first BIOS version (e.g., at a later time upon a user initiation of a reboot or another boot cycle).

In some embodiments, the suppressing comprises clearing a BIOS staging environment of the at least one BIOS chip, wherein the BIOS staging environment comprises an image of a second BIOS version associated with the pending BIOS update. The suppressing may comprise resetting a BIOS update flag.

In one or more embodiments, a user of the at least one processing device is notified of the pending BIOS update, in response to detecting that an update of the first BIOS version is pending. Prior to the detecting that the update of the first BIOS version is pending, a BIOS production environment of the at least one BIOS chip may comprise a production BIOS version and a BIOS staging environment comprises an image of a second BIOS version. The detecting that the update of the first BIOS version is pending may comprise one or more of detecting that a BIOS update flag is set and detecting that a BIOS staging environment comprises the image of a second BIOS version. The user request may be received responsive to the notification. The user request may comprise one or more of an affirmative user request to suppress the pending BIOS update, the user declining to approve the application of the pending BIOS update and a failure of the user to respond to a notification within a designated time.

The particular processing operations and other network functionality described in conjunction with FIGS. 4 and 5, for example, are presented by way of illustrative example only, and should not be construed as limiting the scope of the disclosure in any way. Alternative embodiments can use other types of processing operations for BIOS protection using BIOS update suppression. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for BIOS protection using BIOS update suppression can be employed, for example, to protect a given device following a detection of a pending BIOS update (e.g., by a manual or automated detection). The BIOS update suppression techniques may be activated to protect the current BIOS and prevent the pending BIOS update from being installed. In this manner, the current BIOS will remain active to initiate the boot process that allows the operating system of the given device to load.

Among other benefits, the disclosed BIOS update suppression techniques protect devices from unauthorized, erroneous and/or malicious actions that may impair the operation of a BIOS chip of a given device. Such actions can be detected and overcome using the disclosed BIOS update suppression techniques.

One or more embodiments of the disclosure provide improved methods, apparatus and computer program products for BIOS protection using BIOS update suppression. The foregoing applications and associated embodiments should be considered as illustrative only, and numerous other embodiments can be configured using the techniques disclosed herein, in a wide variety of different applications.

It should also be understood that the disclosed BIOS update suppression techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for BIOS protection using BIOS update suppression may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based BIOS update suppression engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based BIOS update suppression platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
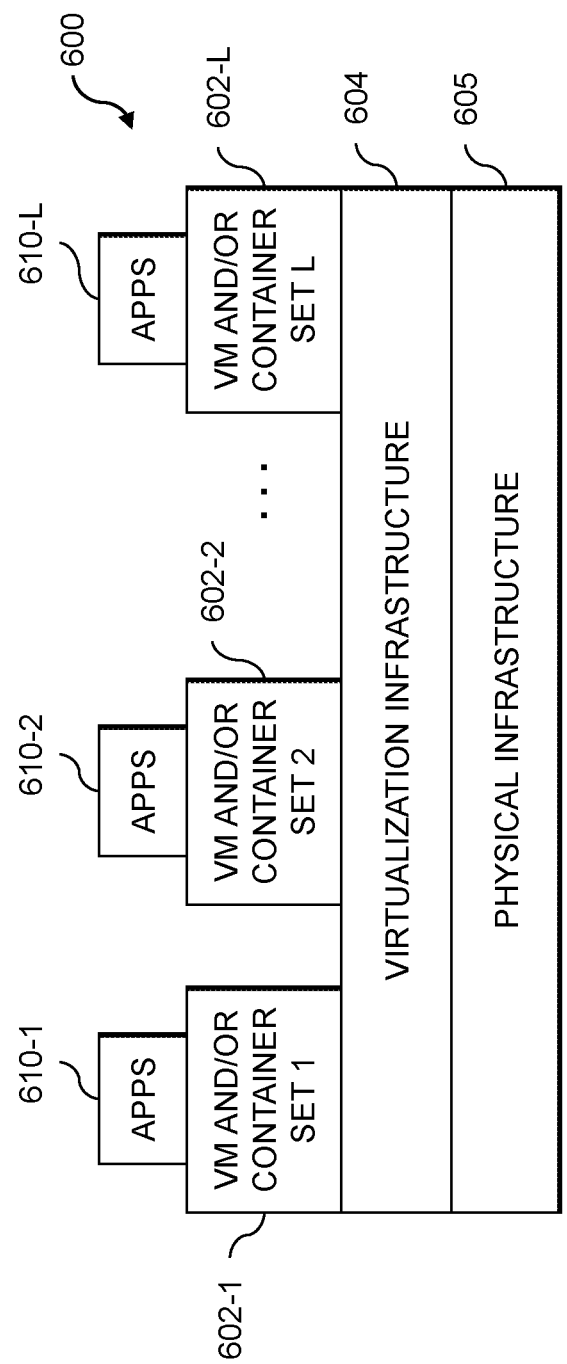
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide BIOS update suppression functionality of the type described above for one or more processes running on a given one of the VMs. For example, each of the VMs can implement BIOS update suppression control logic and associated BIOS protection functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide BIOS update suppression functionality of the type described above for one or more processes running on different ones of the containers. For example, a container host device supporting multiple containers of one or more container sets can implement one or more instances of BIOS update suppression control logic and associated BIOS protection functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
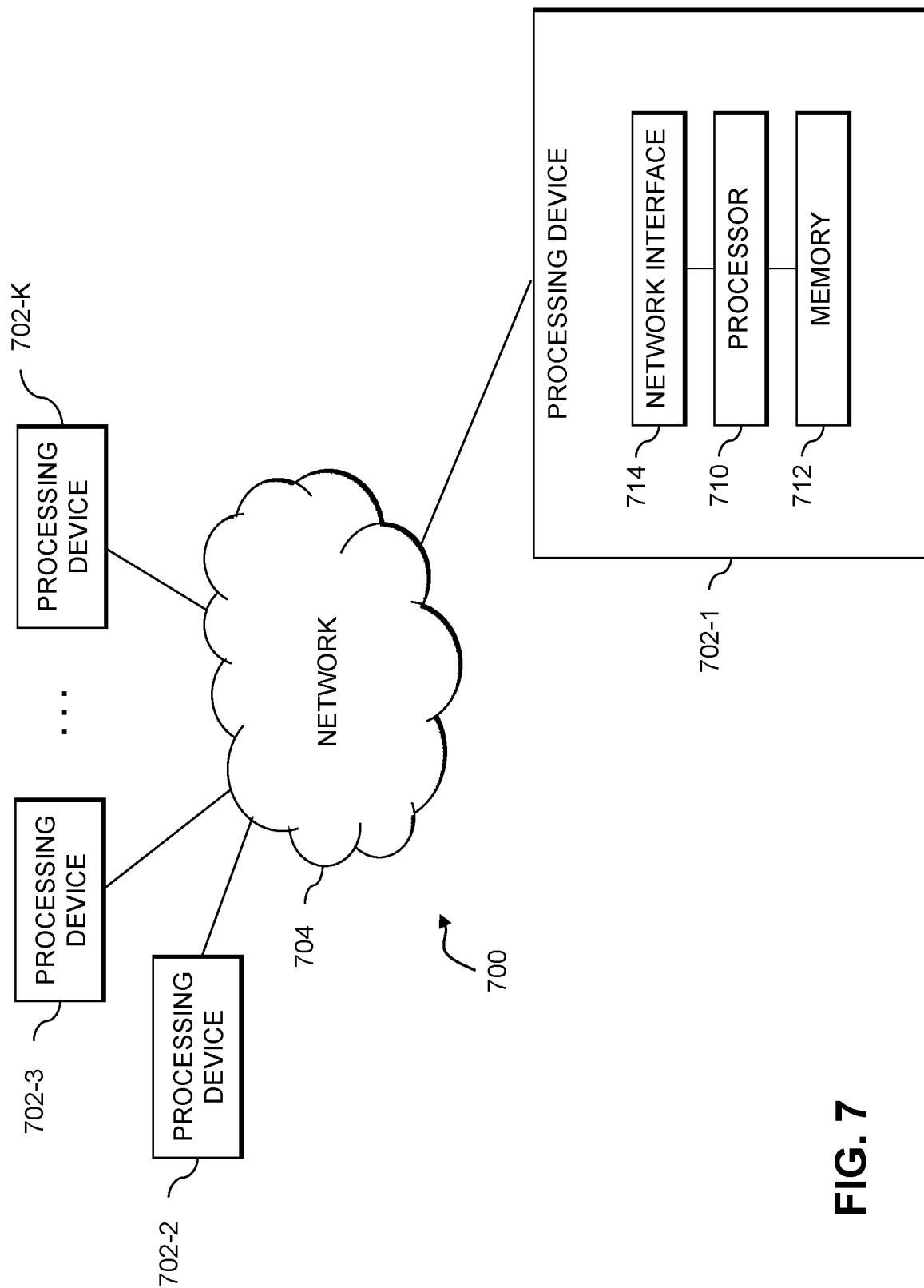
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
  receiving, by an operating system of at least one processing device comprising at least one basic input/output system (BIOS) chip having a first BIOS version, a request to suppress a pending BIOS update, wherein the request to suppress the pending BIOS update is received subsequent to a detection of the pending BIOS update; and
  suppressing an application of the pending BIOS update, in response to the request, wherein a boot process of the at least one processing device uses the first BIOS version;
  wherein the method is performed by the at least one processing device, wherein the at least one processing device further comprises a processor coupled to a memory.

2. The method of claim 1, wherein the suppressing comprises clearing a BIOS staging environment of the at least one BIOS chip, wherein the BIOS staging environment comprises an image of a second BIOS version associated with the pending BIOS update.

3. The method of claim 1, wherein the suppressing comprises resetting a BIOS update flag.

4. The method of claim 1, further comprising notifying, in response to detecting that an update of the first BIOS version is pending, a user of the at least one processing device of the pending BIOS update.

5. The method of claim 4, wherein, prior to the detecting that the update of the first BIOS version is pending, a BIOS production environment of the at least one BIOS chip comprises a production BIOS version and a BIOS staging environment comprises an image of a second BIOS version.

6. The method of claim 4, wherein the detecting that the update of the first BIOS version is pending comprises one or more of detecting that a BIOS update flag is set and detecting that a BIOS staging environment comprises an image of a second BIOS version.

7. The method of claim 4, wherein the request is received responsive to the notification.

8. The method of claim 1, wherein the request comprises one or more of an affirmative request to suppress the pending BIOS update, a user declining to approve the application of the pending BIOS update and a failure of the user to respond to a notification within a designated time.

9. An apparatus comprising:
at least one processing device comprising a processor coupled to a memory and at least one basic input/output system (BIOS) chip having a first BIOS version;
the at least one processing device being configured to implement the following steps:
receiving, by an operating system of at least one processing device comprising at least one basic input/output system (BIOS) chip having a first BIOS version, a request to suppress a pending BIOS update, wherein the request to suppress the pending BIOS update is received subsequent to a detection of the pending BIOS update; and
suppressing an application of the pending BIOS update, in response to the request, wherein a boot process of the at least one processing device uses the first BIOS version.

10. The apparatus of claim 9, wherein the suppressing comprises clearing a BIOS staging environment of the at least one BIOS chip, wherein the BIOS staging environment comprises an image of a second BIOS version associated with the pending BIOS update.

11. The apparatus of claim 9, wherein the suppressing comprises resetting a BIOS update flag.

12. The apparatus of claim 9, further comprising notifying, in response to detecting that an update of the first BIOS version is pending, a user of the at least one processing device of the pending BIOS update.

13. The apparatus of claim 12, wherein the detecting that the update of the first BIOS version is pending comprises one or more of detecting that a BIOS update flag is set and detecting that a BIOS staging environment comprises an image of a second BIOS version.

14. The apparatus of claim 12, wherein the request is received responsive to the notification.

15. A non-transitory processor-readable storage medium having stored therein program code of one or more software programs, wherein the program code when executed by at least one processing device, comprising at least one basic input/output system (BIOS) chip having a first BIOS version, causes the at least one processing device to perform the following steps:
receiving, by an operating system of at least one processing device comprising at least one basic input/output system (BIOS) chip having a first BIOS version, a request to suppress a pending BIOS update, wherein the request to suppress the pending BIOS update is received subsequent to a detection of the pending BIOS update; and
suppressing an application of the pending BIOS update, in response to the request, wherein a boot process of the at least one processing device uses the first BIOS version.

16. The non-transitory processor-readable storage medium of claim 15, wherein the suppressing comprises clearing a BIOS staging environment of the at least one BIOS chip, wherein the BIOS staging environment comprises an image of a second BIOS version associated with the pending BIOS update.

17. The non-transitory processor-readable storage medium of claim 15, wherein the suppressing comprises resetting a BIOS update flag.

18. The non-transitory processor-readable storage medium of claim 15, further comprising notifying, in response to detecting that an update of the first BIOS version is pending, a user of the at least one processing device of the pending BIOS update.

19. The non-transitory processor-readable storage medium of claim 18, wherein the detecting that the update of the first BIOS version is pending comprises one or more of detecting that a BIOS update flag is set and detecting that a BIOS staging environment comprises an image of a second BIOS version.

20. The non-transitory processor-readable storage medium of claim 18, wherein the request is received responsive to the notification.

* * * * *